G. BOURCIER.
CRANK PIN BEARING.
APPLICATION FILED OCT. 29, 1913.
1,157,975.
Patented Oct. 26, 1915.
2 SHEETS—SHEET 2.
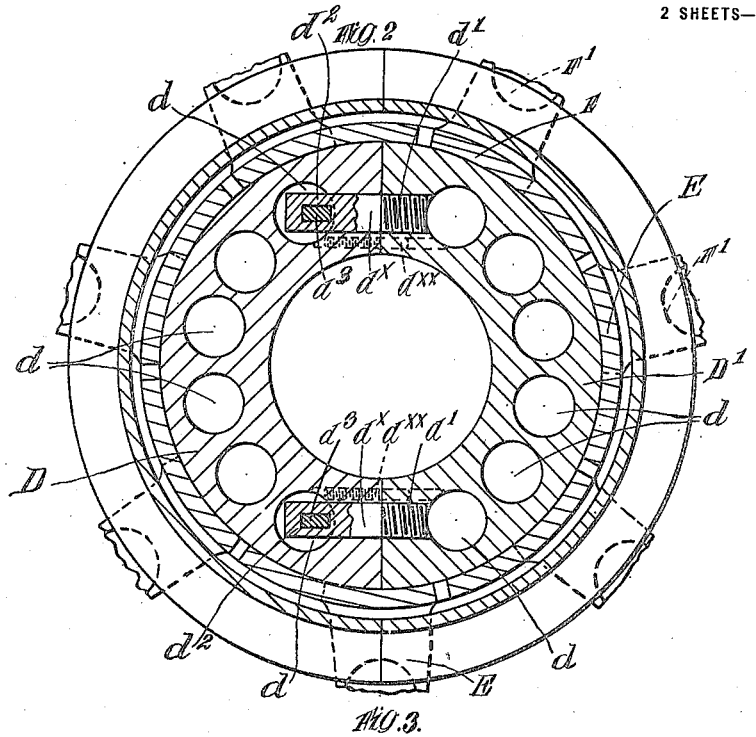
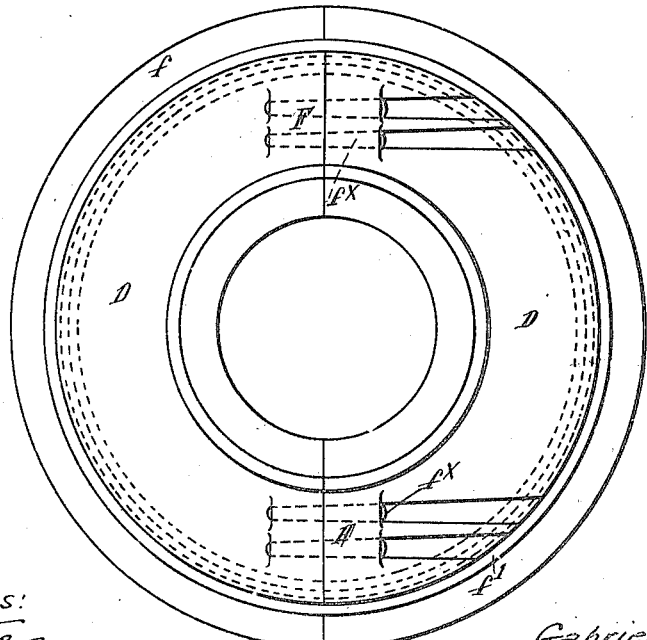

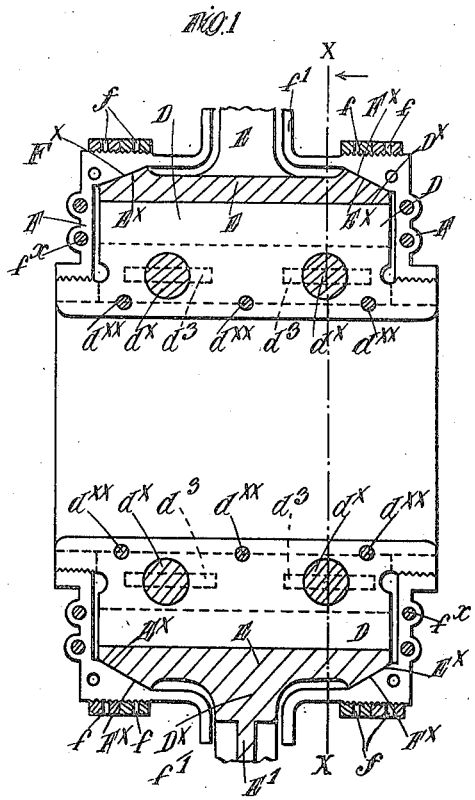

UNITED STATES PATENT OFFICE.

GABRIEL BOURCIER, OF ERITH, ENGLAND, ASSIGNOR TO VICKERS LIMITED, OF WESTMINSTER, ENGLAND.

CRANK-PIN BEARING.

1,157,975.  Specification of Letters Patent.  Patented Oct. 26, 1915.

Original application filed April 18, 1913, Serial No. 762,226. Divided and this application filed October 29, 1913. Serial No. 797,948.

*To all whom it may concern:*

Be it known that I, GABRIEL BOURCIER, a citizen of the Republic of France, residing at Erith Works, Erith, in the county of Kent, England, have invented certain new and useful Improvements in Crank-Pin Bearings, of which the following is a specification.

This application is a division of my co-pending application Serial No. 762226, filed April 18, 1913.

This invention has reference to internal combustion engines particularly those intended for the propulsion of aerial craft and relates to the divided brasses of the crank pin to which the various connecting rods are attached. These connecting rods are usually provided with segmental ends held upon the outer cylindrical surface of the divided brasses by retaining caps, the said brasses being made of considerable thickness for obtaining a large circumferential bearing surface for the connecting rods and formed with longitudinal holes to reduce their weight. These divided brasses are usually connected together by transversely arranged threaded pins inserted through holes formed in the cylindrical surface of the brasses.

According to my invention I dispense with the necessity of making holes in the outer cylindrical surface of the divided brasses so that they possess an entirely smooth bearing surface for the adjacent ends of the various connecting rods. I attain this result by the employment of internally arranged coupling pins which are adapted to be located in such a manner that the slots in their ends for the cotters lie within one or other of the aforesaid longitudinal holes with which the brasses are provided for lightening them, so that the said cotters can be conveniently inserted into or removed from the coupling pins. These coupling pins may be four in number and screw threaded at one end for securing them in one of the meeting faces of the brasses their opposite or slotted ends entering holes in the other meeting face that extend into the adjacent longitudinal holes through which the cotters are introduced into the slots in the coupling-pins.

For sake of convenience the divided brasses and the parts of the connecting rods bearing thereon will be hereafter referred to together as the "big end."

In order that my invention may be clearly understood and readily carried into effect, the same will now be described more fully with reference to the accompanying drawings, in which:—

Figure 1 is a longitudinal sectional elevation of the "big end" of one of the connecting rods taken approximately between the contacting surfaces of the divided brasses. Fig. 2 is a cross sectional view taken approximately on the line $x$—$x$ of Fig. 1. Fig. 3 is an elevation of one of the retaining caps hereinafter referred to.

D D′ are the divided crank pin brasses, $d\ d$ the longitudinal holes therein for reducing the weight, and $d^x$, $d^x$ the four internally arranged coupling pins. $d^{xx}\ d^{xx}$ are small pegs projecting from the face of the brass D and fitting in suitable holes in the face of the brass D′ for the purpose of preventing the brasses from moving longitudinally with respect to each other during the working of the engine.

E E are the segmental ends of the connecting rods.

E′ E′ are the connecting rods the pistons of which are arranged radially around the crank shaft as is well understood.

F F are the retaining caps for holding the segmental ends of the connecting rods during the suction strokes of the engine.

The coupling pins $d^x$ in the form shown are each provided with a screw threaded end $d'$ and a slotted end $d^2$ the screw threaded ends being adapted to be secured in tapped holes in the brass D′, while the slotted ends are adapted, when the brasses are brought together, to pass through suitable holes in the brass D and project into the adjacent longitudinal holes $d$ therein so that the cotters $d^3$ may be inserted in the slotted ends and thereby secure the brasses firmly together. In the example shown a separate cotter is used for each pin, in some cases, however, I may employ long cotters so that one cotter will serve for two pins.

The outer surfaces $E^x$ of the segmental ends E of the connecting rods are tapered to receive a correspondingly tapered part $F^x$ of the caps F F. These caps are formed in halves, as shown in Fig. 3 and are secured together by transverse screws or tapered pins $f^x$. These caps are screw threaded at the center to engage with corresponding threads with which the opposite ends of the brasses are formed for their reception. This arrangement of tapered surfaces enables any play between the connecting rods and the brasses due to wear to be readily taken up by screwing the caps F F more or less upon the threaded ends of the brasses. These caps are also provided with annular flanges f' which lie in close contiguity to the connecting rods and resist any twisting tendency of the latter during the working of the engine.

The periphery of the caps F may be screw threaded for the reception of one or more locking rings f f which are adapted to clamp the caps firmly at their periphery and thus prevent the halves of the said caps from separating at their periphery which they otherwise would be liable to do under the influence of the screws or pins $f^x$, when the latter are tightened up.

What I claim and desire to secure by Letters Patent of the United States is:—

1. In an internal combustion engine, the combination with a plurality of connecting rods provided with segmental and tapered ends, of two members formed with a circumferential bearing surface for said segmental ends and with longitudinal holes and affording a crank pin opening, slotted coupling pins carried by one of said members, cotters disposed within certain of the longitudinal holes in the other of said members and engaging the slots in the coupling pins, adjustable caps made in halves mounted on said members and tapered to engage the tapered portions of the segmental ends of the connecting rods, and means for securing said halves together.

2. In an internal combustion engine, the combination with a plurality of connecting rods provided with segmental and tapered ends, of two members formed with a circumferential bearing surface for said segmental ends and with longitudinal holes and affording a crank pin opening, slotted coupling pins carried by one of said members, cotters disposed within certain of the longitudinal holes in the other of said members and engaging the slots in the coupling pins, adjustable caps made in halves mounted on said members and tapered to engage the tapered portions of the segmental ends of the connecting rods, and means including rings in engagement with the periphery of each of said caps for securing said halves together.

In testimony whereof I affix my signature in presence of two witnesses.

GABRIEL BOURCIER.

Witnesses:
   L. M. WEST JACKSON,
   T. SELLY WORD.